(12) United States Patent
Simon

(10) Patent No.: US 7,334,933 B1
(45) Date of Patent: Feb. 26, 2008

(54) UNIFIED OPTICAL COLLECTION AND DISTRIBUTION OF LIGHT FROM QUASI-POINT SOURCES INCLUDING LEDS, AND LINEAR LIGHT SOURCES

(76) Inventor: Jerome H. Simon, 70 Sumner St., Newton Centre, MA (US) 02459

( * ) Notice: Subject to any disclaimer, the term of this patent is extended or adjusted under 35 U.S.C. 154(b) by 0 days.

(21) Appl. No.: 11/268,277

(22) Filed: Nov. 4, 2005

(51) Int. Cl.
*F21V 7/04* (2006.01)

(52) U.S. Cl. ...................... 362/615; 362/328

(58) Field of Classification Search .............. 362/100, 362/615, 612–614, 625–626, 608–610, 602, 362/604, 328
See application file for complete search history.

(56) References Cited

U.S. PATENT DOCUMENTS 6,193,383 B1 * 2/2001 Onikiri et al. ............... 362/26
6,530,671 B2 * 3/2003 Taniguchi et al. .......... 362/619
6,951,415 B2 * 10/2005 Amano et al. .............. 362/520
2004/0114343 A1 * 6/2004 Ho .............................. 362/31

* cited by examiner

*Primary Examiner*—Thomas M. Sember
*Assistant Examiner*—Julie A. Shallenberger
(74) *Attorney, Agent, or Firm*—Burns & Levinson LLP; Harvey Kaye; Jerry Cohen

(57) ABSTRACT

A lighting device that provides a surface that uniformly projects light from single or multiple light sources. It also provides a lighting device that minimizes the number of optical components between the light source and the viewer so as to increase efficiency. It further provides an efficient light projecting surface that can be produced in large sizes, as well as a modular system of components that can be assembled in varied sizes and shapes. Various lighting sources may be used including quasi-point light sources and linear light sources and these light sources may also be used together.

11 Claims, 4 Drawing Sheets

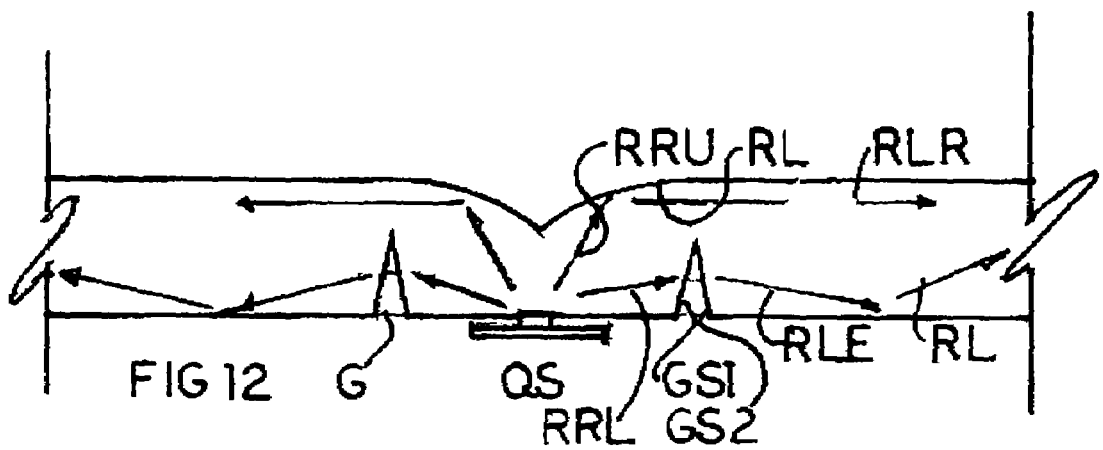
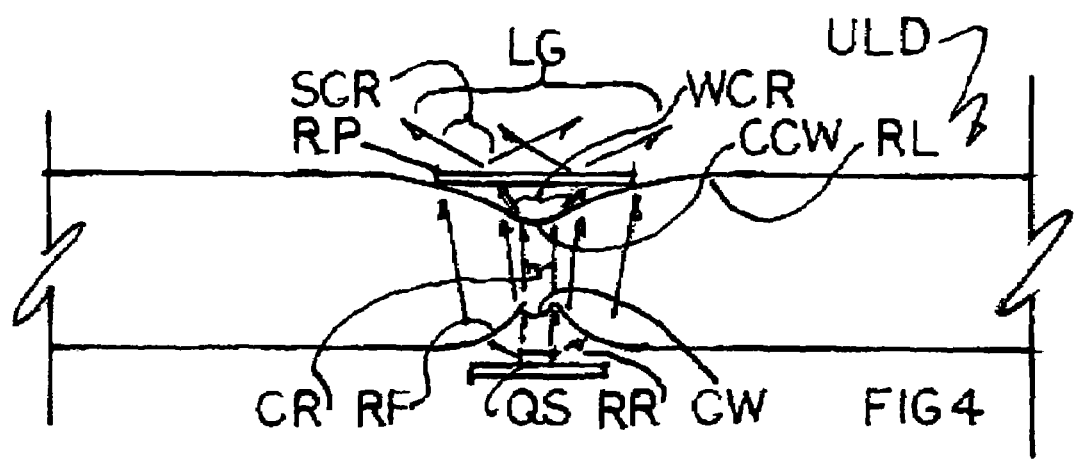
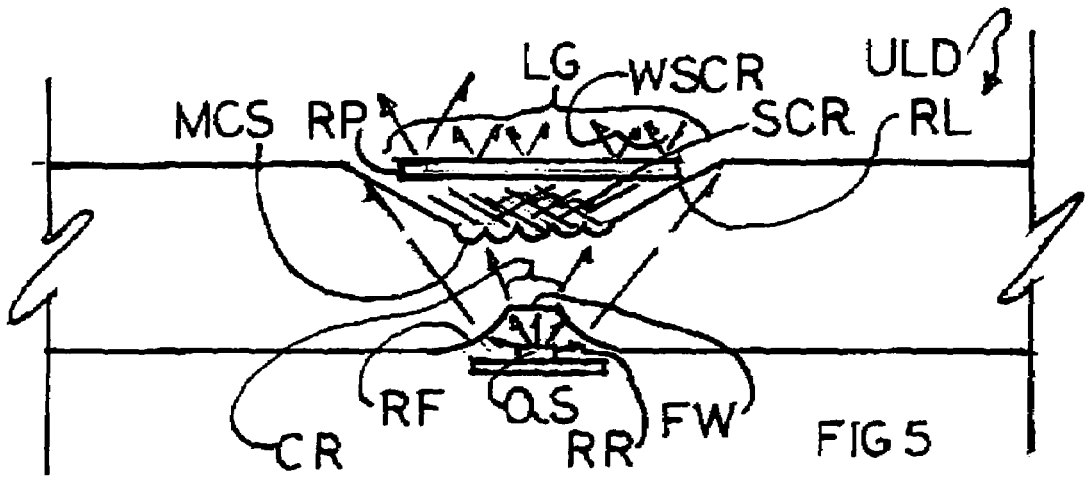

ed light RLR (as described in FIG. 2) expands within ULD a portion of the rays are reflected by RS onto and scattered by SR as rays SCR. Also a portion of RLR impinges directly onto and are scattered by SR.

UNIFIED OPTICAL COLLECTION AND DISTRIBUTION OF LIGHT FROM QUASI-POINT SOURCES INCLUDING LEDS, AND LINEAR LIGHT SOURCES

FIELD OF INVENTION

The present invention relates generally to the lighting field, and, more particularly to the unified optical collection and distribution of light from quasi-point light sources, including LEDs and linear light sources.

SUMMARY OF INVENTION

The present invention provides a surface that uniformly projects light from single or multiple light sources. It also provides a lighting device that minimizes the number of optical components between the light source and the viewer so as to increase efficiency. It further provides an efficient light projecting surface that can be produced in large sizes, as well as a modular system of components that can be assembled in varied sizes and shapes.

BRIEF DESCRIPTION OF THE DRAWINGS

These and other objects, features and advantages will be apparent from the following detailed description of preferred embodiments taken in conjunction with the accompanying drawings in which:

FIG. 4 is a schematic cross sectional view similar to ULD of FIG. 2.

FIG. 5 is a schematic cross sectional view of ULD similar to ULD in FIG. 4.

FIG. 12 is a sectional diagram of another lighting device in accordance with the present invention.

DETAILED DESCRIPTION OF PREFERRED EMBODIMENTS

Figure 1:
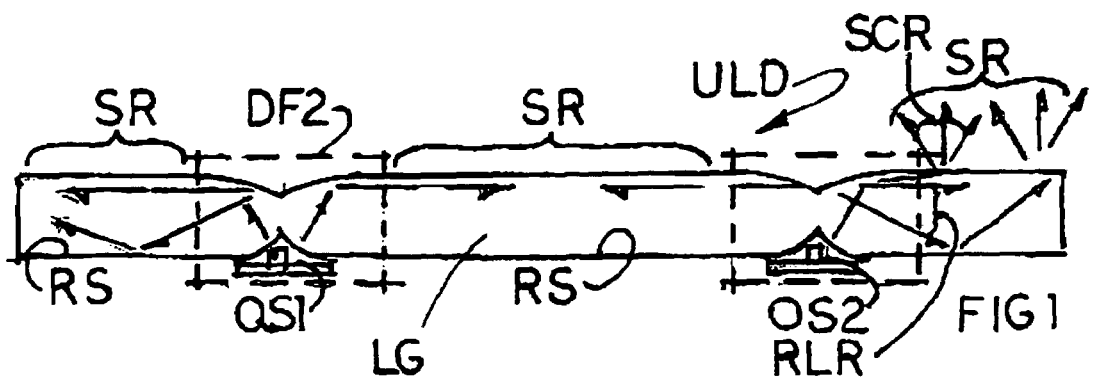
FIG. 1 is a sectional diagram of a first lighting device in accordance with the present invention.
Figure 6:
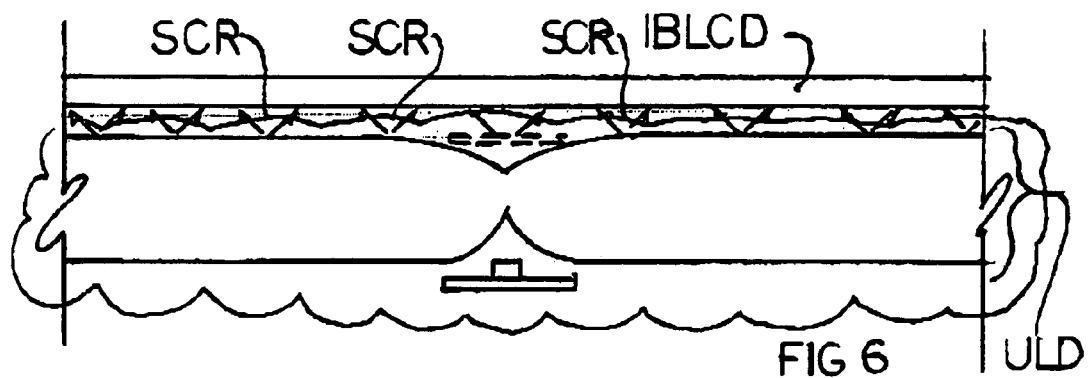
FIG. 6 is a diagrammatic sectional view which is a simplified graphic of FIG. 1.

FIG. 1 shows a lighting device of two quasi-point light sources QS1 and QS2 located in proximity to a unified optical body ULD designed to collect radiant energy from QS1 and QS2 and distribute it throughout ULD. ULD is further comprised of a light collection system DF2, as shown in more detail in FIG. 2, a reflecting surface RS and a refracting surface SR. ULD can be hollow or solid. As reflected light RLR (as described in FIG. 2) expands within ULD a portion of the rays are reflected by RS onto and scattered by SR as rays SCR. Also a portion of RLR impinges directly onto and are scattered by SR.

Figure 2:
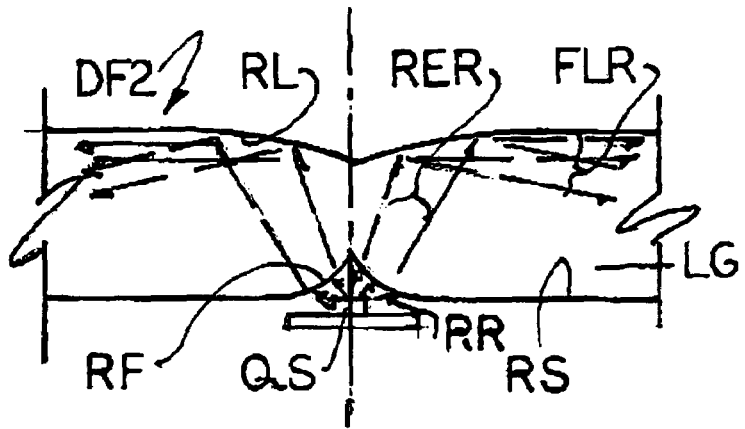
FIG. 2 is a schematic sectional view of the light collection system DF2 of FIG. 1.

FIG. 2 shows the light collection system DF2 of FIG. 1. Radiant light RR from QS enters ULD through convex surfaces RF which condenses RR into rays RER which strike curved surface RL further condensing and reflecting RER as rays RLR. LG is the light guide portion of UL as defined by SR and RS.

Figure 3:
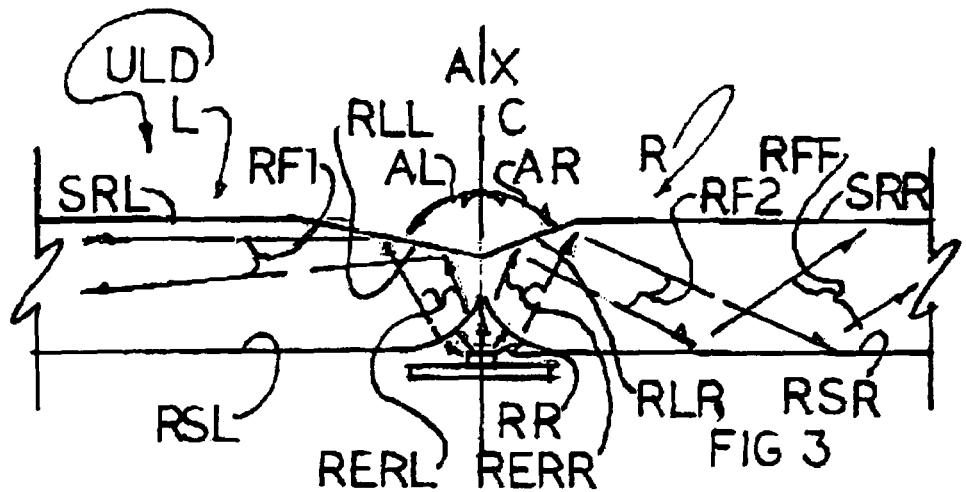
FIG. 3 is an diagrammatic sectional view of an embodiment which is similar to that to FIG. 2.

FIG. 3 is a section of ULD differing from that of FIG. 2 in that the curved reflector RL of FIG. 2 is flat RFL and when rotated forms reflective cone C. Further, cone C (for graphic purposes) is divided by axis AX into a left portion L and a right portion R. Angle AL of side L is such that rays RERL are reflected by RLL as rays RF1 which are substantially parallel to the light guide formed by SRL & RSL. Angle AR of side R is such that rays RF2 are reflected onto and in turn by RSR onto and thru SRR.

FIG. 4 is a view of ULD that is similar to ULD in FIG. 2, differing in that a convex surface (convex window) CW is at the apex of RF allowing a percentage of radiant light RR to be focused onto and through CCW a concave window at the apex of RL which spreads rays CR as rays WCR which strike refracting plate RP refracting WCR into rays SCR. CCW can be a convex window as well as concave.

FIG. 5 is a ULD that is similar to ULD in FIG. 4, differing in that a substantially flat window FW is as the apex of RF allowing a portion of RR to pass through RF as rays CR which strike the refracting surface MCS (which can have multiple prisms, convex bumps, concave depressions, or be diffusing) causing CR to scatter as ray SCR through RP as rays WSCR.

Figure 7:
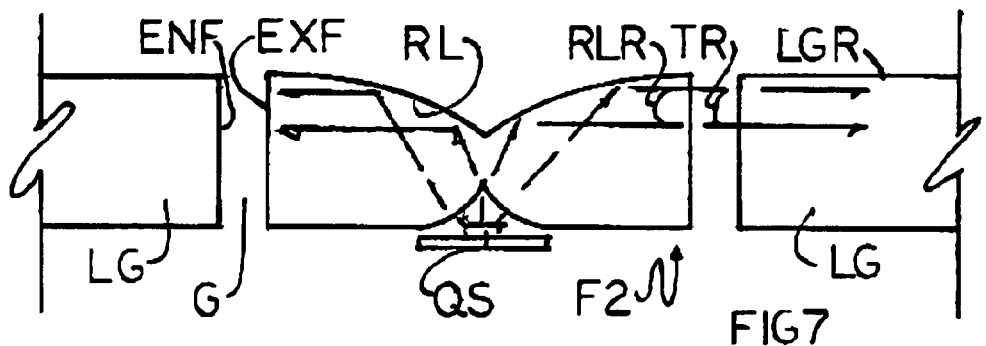
FIG. 7 is a diagrammatic sectional view of an optical system similar to that shown in FIGS. 1 and 2, but with differences.

FIG. 7 is a cross sectional diagram of an optical system similar to that shown in FIG. 1 and FIG. 2, differing in that a gap G separates the collection portion and the light guide portion of the configuration. Rays RLR exit face EXF of the collimation portion as rays TR and enter through entry face ENF and into LG as LGR.

Figure 8:
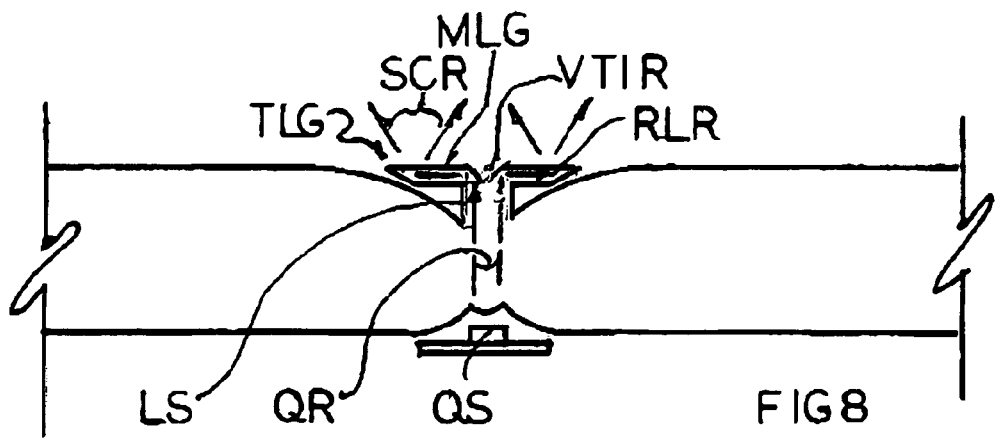
FIG. 8 is a diagrammatic sectional view similar to FIG. 4.

FIG. 8 is a cross sectional diagram similar to that of FIG. 4, differing in that rays CR are projected into and through a "T" shaped light guide comprised of LS a portion that allows QR to pass through and onto a prismatic "V" shaped surface VTIR and by total internal reflection causes rays QS to be reflected as rays RLR to enter portion MGL as rays RLR. As rays RLR enter and pass through MLG the are reflected and refracts (in a similar manner as RLR of FIGS. 1 and 2) and leave as scatter rays SCR.

Figure 9:
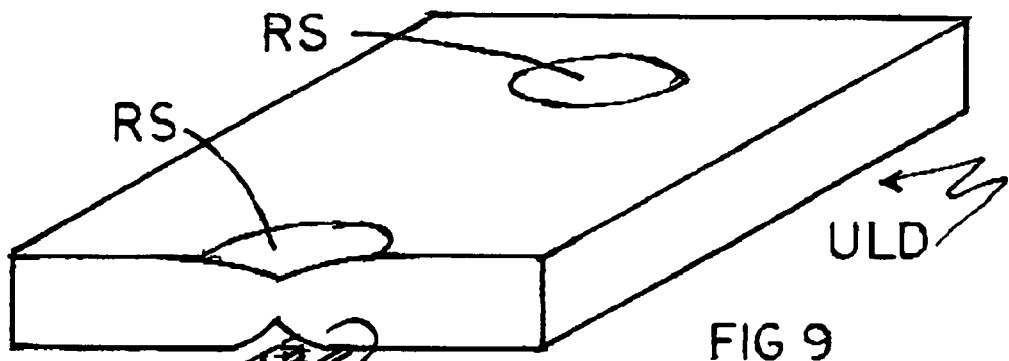
FIG. 9 is a diagrammatic isometric view showing a section of the lighting device shown in FIGS. 1 and 2.

FIG. 9 is a three dimensional diagram that includes a section view of a lighting device ULD as shown in FIGS. 1 and 2. Both RS and RF are shown as depressions in ULD.

Figure 10:
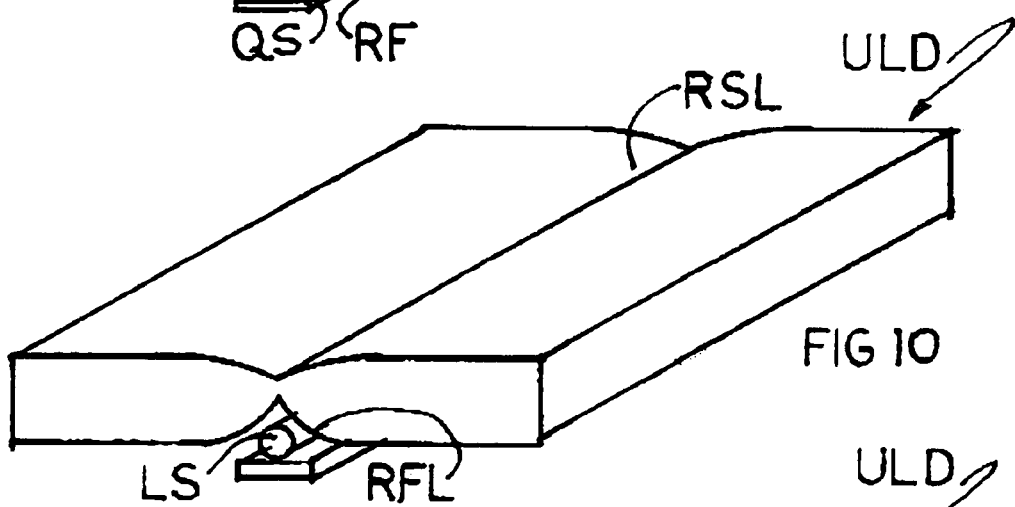
FIG. 10 is a diagrammatic isometric view similar to that of FIG. 9 but with some differences.

FIG. 10 is a three dimensional diagram differing from FIG. 9 in that the depressions in ULD of FIG. 9 RS and RF have been replaced by linear depressions RSL and RFL respectively to accommodate linear light source LS which could be of the fluorescent or neon variety.

Figure 11:
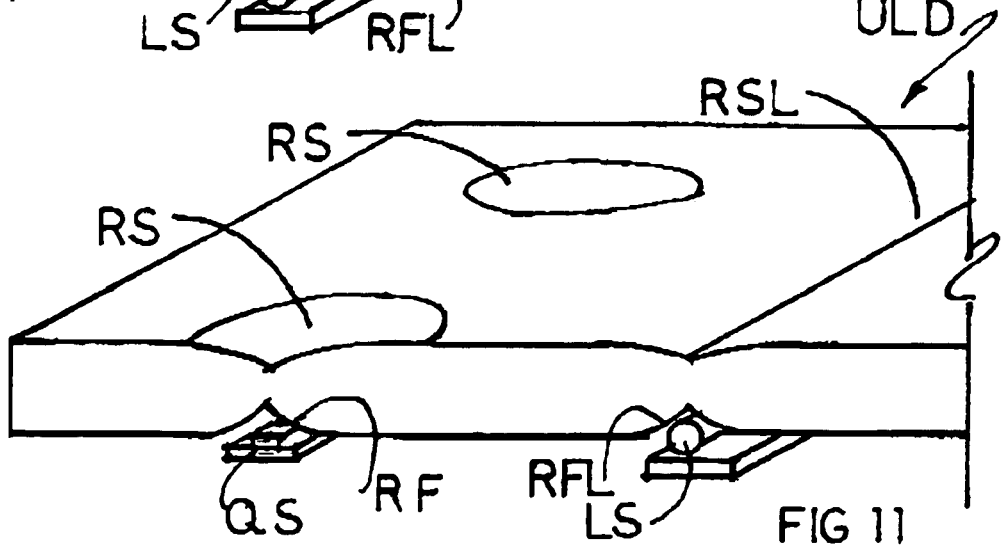
FIG. 11 is an isometric diagram of a lighting device similar in function and design to the lighting device shown in FIG. 1, and having both a quasi point light source and a linear light source to illuminate the same unified optical body ULDC.

FIG. 11 is a three dimensional diagram of a lighting device similar in function and design to the lighting device shown in FIG. 1, differing in that both a quasi point light source(s) QS and a linear light source(s) LS (as illustrated in FIG. 10) are used to illuminate the same unified optical body ULDC.

FIG. 12 is a section diagram of another lighting device similar to FIG. 2 wherein the upper portion of the light rays RRU from quasi-point light source QS is reflected by a depressed rotated reflecting surface RR into the unified optical body as rays RLR. The lower portion of light rays RRL, from QS is refracted surfaces GS1 and GS2 of radial gap G as rays RLE and RL.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A lighting device in the form of a unified optical light guide, for uniform distribution of light from multiple light quasi-point light sources comprising:
    at least one quasi-point light source;
    a rotated convex collecting surface depressed within a light guide at least partially surrounding said quasi-point light source;
    a rotated reflecting surface depressed within the light guide to reflect rays from the collecting surface into and through the guide; and
    a convex surface located at the apex of the rotated convex collecting surface and a concave surface located at the apex of the rotated reflecting surface.

2. A lighting device as defined in claim 1 further comprising a diffusion surface that receives light from the concave surface at the apex of the rotated reflecting surface.

3. A lighting device in the form of a unified optical light guide, for uniform distribution of light from multiple light quasi-point light sources comprising:
    at least one quasi-point light source;
    a rotated convex collecting surface depressed within a light guide at least partially surrounding said quasi-point light source;
    a rotated reflecting surface depressed within the light guide to reflect rays from the collecting surface into and through the guide; and
    a flat window located at the apex of the rotated convex and light collecting surface and a refracting surface located at the apex of the rotated reflecting surface.

4. A lighting device in the form of a unified optical light guide, for uniform distribution of light from multiple light quasi-point light sources comprising:
    at least one quasi-point light source;
    a rotated convex collecting surface depressed within a light guide at least partially surrounding said quasi-point light source;
    a rotated reflecting surface depressed within the light guide to reflect rays from the collecting surface into and through the guide; and
    the device is used to backlight an LCD screen or equivalent screen for the purposes of backlighting.

5. A lighting device in the form of a unified optical light guide, for uniform distribution of light from multiple light quasi-point light sources comprising:
    at least one quasi-point light source;
    a rotated convex collecting surface depressed within a light guide at least partially surrounding said quasi-point light source;
    a rotated reflecting surface depressed within the light guide to reflect rays from the collecting surface into and through the guide; and
    there is a gap within the light guide severing the collecting portion of the guide form the rest of the guide.

6. A lighting device in the form of a unified optical light guide, for uniform distribution of light from multiple light quasi-point light sources comprising:
    at least one quasi-point light source;
    a rotated convex collecting surface depressed within a light guide at least partially surrounding said quasi-point light source;
    a rotated reflecting surface depressed within the light guide to reflect rays from the collecting surface into and through the guide;
    at least one quasi-point light source at least partially surrounded by a depressed rotated refractor, and a depressed rotated reflector; and
    at least one linear light source, at least partially surrounded by a depressed linear refractor and a depressed linear reflector.

7. A lighting device, in the form of a unified optical light guide, for uniform distribution of light from multiple light sources comprising:
    at least one linear light source;
    a linear convex entry collecting surface depressed within a light guide at least partially surrounding said light source; and
    a linear internally reflecting surface depressed within the light guide to reflect rays from the collecting surface into and through the guide.

8. A lighting device, in the form of a unified optical light guide, for uniform distribution of light from multiple light sources comprising:
    at least one linear light source;
    at least one quasi-point light source;
    a rotated collecting surface depressed within a light guide at least partially surrounding said quasi-point light source; and
    a rotated reflecting surface depressed within the light guide to reflect rays from the rotated collecting surface into and through the guide.

9. A lighting device in the form of a unified optical light guide, for uniform distribution of light from multiple light quasi-point light sources comprising:
    at least one quasi-point light source;
    a rotated convex collecting surface depressed within a light guide at least partially surrounding said quasi-point light source; and
    a rotated reflecting surface depressed within the light guide to reflect rays from the collecting surface into and through the guide, the collecting surface being an entry and light collecting surface, and the reflecting surface being an internally reflecting surface.

10. A lighting device in the form of a unified optical light guide, for uniform distribution of light from multiple light quasi-point light sources comprising:
    at least one quasi-point light source;
    a rotated convex collecting surface depressed within a light guide at least partially surrounding said quasi-point light source;
    a rotated reflecting surface depressed within the light guide to reflect rays from the collecting surface into and through the guide; and
the collecting surface being solid and internally reflecting and the light guide being hollow.

11. A lighting device as defined in claim 8 wherein there are linear collecting and reflecting surfaces which at least partially surround said linear light source.

* * * * *